Jan. 12, 1943.     O. MADER     2,308,376

AIR-REMOVING APPARATUS

Filed June 4, 1941

Inventor

OTTO MADER,

Patented Jan. 12, 1943

2,308,376

UNITED STATES PATENT OFFICE 2,308,376

AIR REMOVING APPARATUS

Otto Mader, Dessau-Ziebigk, Germany; vested in the Alien Property Custodian

Application June 4, 1941, Serial No. 396,637
In Germany February 20, 1940

9 Claims. (Cl. 184—6)

This invention relates to an arrangement for removing air from the oil in the lubricating oil circuit of an internal combustion engine or the like.

It is, of course, well known that oil, travelling from the oil supply tank through the feed pumps and back again, takes or picks up air which becomes mixed therewith. This very greatly reduces the lubricating effectiveness of the oil. If possible, therefore, the oil must be freed from air at some point in the oil circuit to prevent progressive deterioration.

There has already been an attempt to solve this problem by installing a centrifuge in the lubricating oil circuit. The oil thus freed from air, however, is then conducted to the lubricating points and again becomes mixed with air. In flowing through the crankshaft bore, the oil is subjected to a strong centrifugal action because of the fact that it is carried along by the rapidly rotating shaft. In this manner the air particles are again separated out, and air pockets can form in the bore and cause a cutting off of the oil stream. This must be avoided as a dry bearing will quickly seize, and only completely air-free oil should be conducted to the crank shaft or a continuous removal of air must be carried out in the same.

One previous effort to solve this problem attempted to remove at least part of the air from the oil entering the crankshaft. Known devices attacking the problem from this angle, however, have very poorly utilized the available space there (which space is already limited because of structural reasons), and it has never been possible to produce sufficient removal of air from the oil entering the crankshaft bore. Above all, moreover, the mere removal of air at the beginning of the crankshaft oil path is not always sufficient, since air will become mixed with the oil again in its comparatively long path through the bores in the crankshaft.

These drawbacks are avoided by the present invention.

The principal object of this invention is the provision of a device for removing air from the oil in the lubricating oil circuit of an internal combustion engine.

Another object of the invention is to provide such a device as will avoid the drawbacks of prior known devices designed for this purpose.

Still a further object of invention is to provide a device for separating air from oil at the start of the oil path through the shaft trunnion and lead the air off in the direction of the shaft axis.

A further object of the invention is to separate substantially continuously air from oil during the passage of the lubricant through the crankshaft.

Moreover, it is an object of the invention to provide air removing devices at certain or at all bearings, said devices being provided with means by which air collecting in the recesses of the crankshaft or the bearings can be lead off.

The invention has for a further object the provision of an air removing arrangement which is efficient in operation, utilizes space to the best advantage, and is simple in construction.

Other objects will be more apparent from the following description and claims when read in conjunction with the accompanying drawing, in which:

Fig. 1 is a partial longitudinal section of a crankshaft provided with air removing devices constructed according to the invention.

Fig. 2 is an enlarged detail view in section showing a closure member for a crankshaft bearing.

Fig. 3 is an enlarged detail view in section of a few thread turns of a screw connection in accordance with one feature of the invention.

With reference now to Fig. 1 of the drawing, the crankshaft is provided with bores 1, 2 and 3 which are disposed lengthwise and communicating transverse bores 4 and 5, through which the lubricating oil passes from a receptacle or other source (not shown) through the crankshaft to the points to be lubricated.

The bore hole 1 in the shaft trunnion 6 is made especially large and is provided with closure members at both ends as indicated by the reference characters $a$ and $b$. The closure member $a$ is constructed so that the oil can be led from the source of supply into the bore 1 therethrough. It consists of a cover plug member 9 provided with a central bore 7 and a pipe fitting 8. This cover 9 is plugged into a drilled out portion 10 in the shaft trunnion 6 and is fixed in position by a counter-screw annular nut 11. The bore 7 in the cover 9, of course, rotates with the crankshaft and is connected in a known manner (not illustrated further) with the stationary lubricating oil supply pipe. A cup-like member is fitted over the pipe fitting 8. This cup-like member consists of the sleeve portion 13 connected to the pipe fitting 8 by ribs 12, the arched end 14 being screwed into the same.

The oil entering the pipe fitting 8 has its direction reversed by the cupped end 14, this reversing movement being aided by a central raised portion 14a in the cupped end. The oil is thus conducted into the passages enclosed by the pipe fitting 8, sleeve portion 13 and the ribs 12 so as finally to be thrown against the inner wall of the shaft trunnion 6. Because of the means just described the oil is thus thrown outwardly and at the same time brought to the angular speed of the crankshaft so that along the whole length of the bore 1 further centrifugal action on the oil, that is, separation of the air particles from the oil, can take place.

In this way the air separated from the oil collects along the axis of the shaft trunnion 6 and is led to the outside from the closure member b according to another feature of the invention.

The closure member b consists of a disc-like plate 15 which serves the purpose of actually sealing the bore 1. This plate is provided with an aperture at the middle and with screw threads as shown in Fig. 1 of the drawing. A bolt 16 is screwed into the aperture, and this bolt rests against a cross piece 17 likewise having a central aperture. Since the cross piece 17 rests with its vanes 18 against a shoulder 19 in the bore 1, the disc 15 is pressed tightly against the opening of the bore 1 when bolt 16 is tightened.

For carrying off the air from bore 1 to outside of the crankshaft, the bolt 16 is provided with a central bore 20 extending through the axis of the bolt, and the diameter of this bore is preferably small so that there will be no considerable loss of pressure in the lubricating oil circuit if oil enters the air removal hole 20 after air has been removed through the hole.

The oil is conducted to the lubricating points of the crankshaft after it has been freed from air throughout the whole length of the bore 1, through transverse bore 4 positioned intermediate the length of bore 20, and into the bore 2. From there a portion of the oil can reach the bearing surfaces of a bearing enclosing the crankshaft at this point through the oil passage 21.

Air is likewise removed in the bore 2, the bore 3 and in all of the other bores of the crankshaft. This is accomplished in substantially the same way as that described in connection with the bore 1. The specific means for accomplishing this are illustrated in greater detail in Fig. 2 as comprising a crankshaft closure member 25 which is engaged by a supporting bearing 26. The oil flows through the transverse bore 27 into the bore 28 and is thrown against the inner wall of the same by reason of the centrifugal force and is thereby again separated from the air contained in the bore 28.

The bore 28 is closed in a manner similiar to the closure b of Fig. 1. However, no cross piece is used in this connection, but on the contrary there are provided two plate-like discs 29 and 30 pressed tightly against the openings of the bore 28 by a bolt 31, the shank of which passes loosely through plate 29 and is threaded into plate 30, a lock nut 32 being provided for the extending end to insure against loosening.

The air separated and collected along the axis of the bore 28 is carried off through a spiral groove 33 that follows the edges of the screw threads of the bolt 31 and enters a small passage 34 drilled in disc 30. This spiral groove passage is indicated in Fig. 3 of the drawing and can be made simply by grinding down the threaded tops of the bolt 31 or by providing the bolt in advance with a trapezoidal thread. The connection between the spiral groove passage 33 and the passage 34 is preferably produced by providing a cut-in portion 35 on the bolt 31. The oil may escape through a second bore similar to 27, as is shown in Figure 1, and a drill hole similar to 21 may be provided to lubricate the bearing 26 as is obvious.

The invention which has been described is efficient in solving the difficulties encountered in prior structures and referred to at the beginning of this specification. Moreover, it makes use admirably of the limited space available in crankshafts and insures the efficient removal of air from lubricating oil at all points in a crankshaft.

Obviously minor changes in construction may be made without departing from the invention.

I claim:

1. In a crankshaft for in-line internal combustion engines, an arrangement for removing air from the internal lubricating oil circuit of said crankshaft, said crankshaft being comprised of axial sections and bearing sections all having longitudinal bores therethrough, closure means for each of the ends of each section, the closure means at one end of the crankshaft having an opening for the admission of lubricating oil, means within the crankshaft for reversing the flow of the entering oil and for directing it to the inner wall of that section of the crankshaft, oil passages leading from each section to the next adjacent section, and relatively small air outlet ports in the closure members of said axial sections.

2. In a crankshaft for in-line internal combustion engines, an arrangement for removing air from the internal lubricating oil circuit of said crankshaft, said crankshaft being comprised of axial sections and bearing sections all having longitudinal bores therethrough, plug means at one end of said crankshaft, said plug means having a central opening for the admission of oil, means within the crankshaft for reversing the flow of the entering oil and for directing it to the inner wall of the longitudinal bore of that section of the crankshaft in which the oil enters, closure means for the end of said last named section and of each other section of the crankshaft, oil passages leading from one section to the next adjacent section, and air outlet ports in the closure members of said axial sections.

3. In a crankshaft for in-line internal combustion engines, an arrangement for removing air from the internal lubricating oil circuit of said crankshaft, said crankshaft being comprised of axial sections and bearing sections all having longitudinal bores therethrough, a plug in the bore in the crankshaft at one end thereof, said plug having a central opening for the admission of oil, a cup-like member secured to said plug, the open end of said cup being disposed in the path of the incoming oil and the inside bottom of the cup having surfaces curved to reverse the flow of the oil, closure means for the other end of said bore and for the ends of each of the sections of the crankshaft, oil passages leading from the bore of one section to the bore of the next adjacent section, small air outlet means in said closure means, said air outlet means being disposed to lead off the air in the direction of the axis of each respective section.

4. In a device as defined in claim 1, the closure means other than the one at the oil admission end comprising, disc means, and bolt means passing through cross members fixed in said bores for securing the disc means tightly in place.

5. In a device as defined in claim 1, the closure means other than one at the oil admission end comprising, disc means, and bolt means passing through cross members fixed in said bores for securing the disc means tightly in place, said air outlet ports being located in the axes of said bolt means.

6. In a device as defined in claim 1, the closure means other than the one at the oil admission end comprising, cross bars fixed in said bores near the ends of each section, said bars each having an opening for the passage of a bolt, a pair of discs for each end of each section, and bolts passing through said cross bars for securing each pair of discs in position.

7. In a device as defined in claim 1, the closure means other than the one at the oil admission end comprising, disc means disposed in the ends of said sections, and bolts passing through means rigid with the crankshaft for securing said discs in position, the threads of said bolts being flattened to form spiral air outlet passages.

8. An air and oil separating system for the lubricant of an internal combustion engine comprising means for conducting the lubricant through the crankshaft of said engine and separating air from oil by the rotation of said crankshaft, and means communicating with said conveying means for conducting the separated air outward of said crankshaft.

9. An air and oil separating system for the lubricant of an internal combustion engine comprising an enlarged axial bore in the crankshaft of said engine, means for introducing the lubricant in said bore and centrifuging the air therefrom, and means for conducting off the separated air.

OTTO MADER.